W. MEYER.
X-RAY STAND.
APPLICATION FILED FEB. 18, 1918.
1,414,658.
Patented May 2, 1922.
3 SHEETS—SHEET 3.
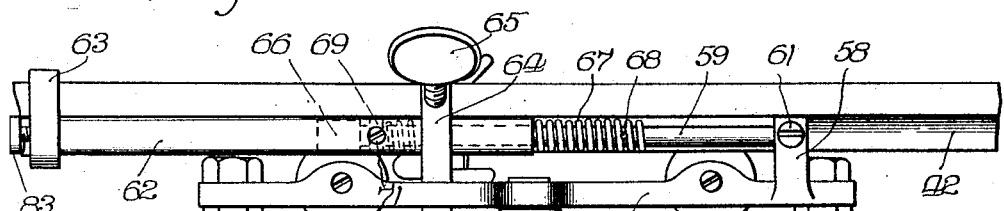
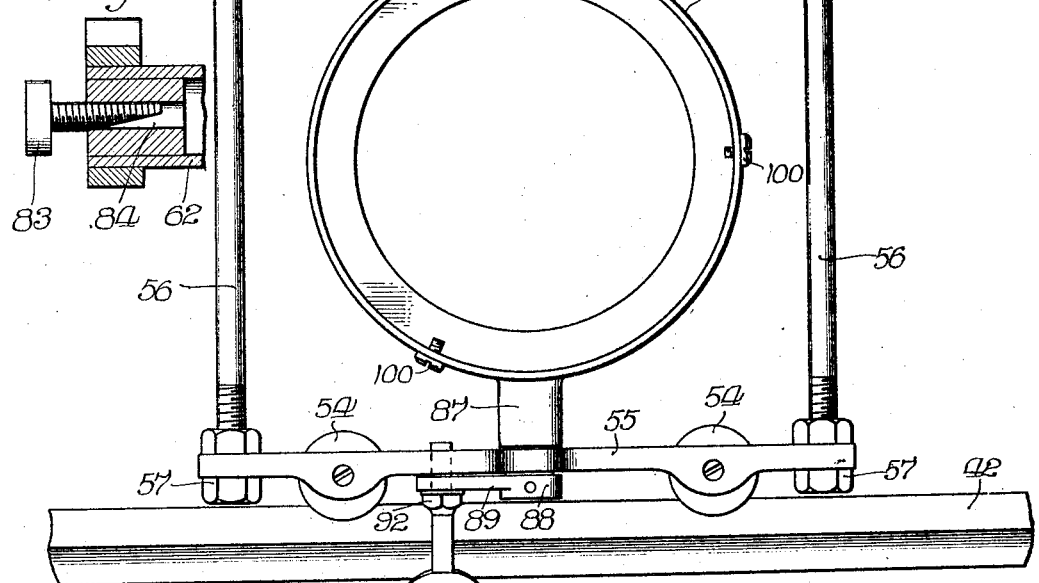
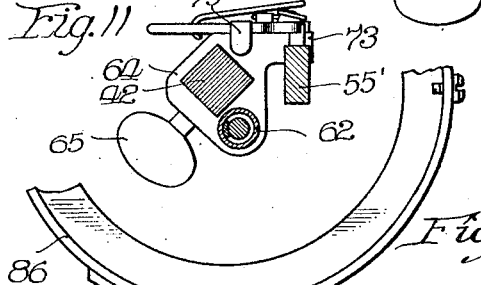
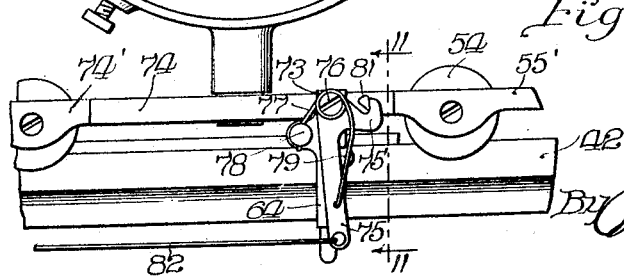
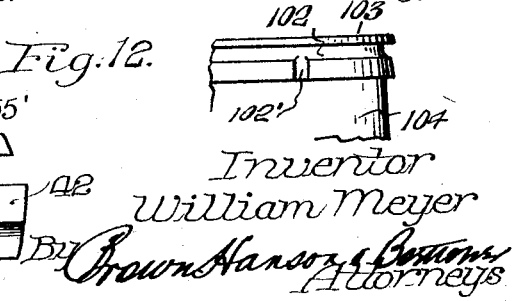
Inventor
William Meyer

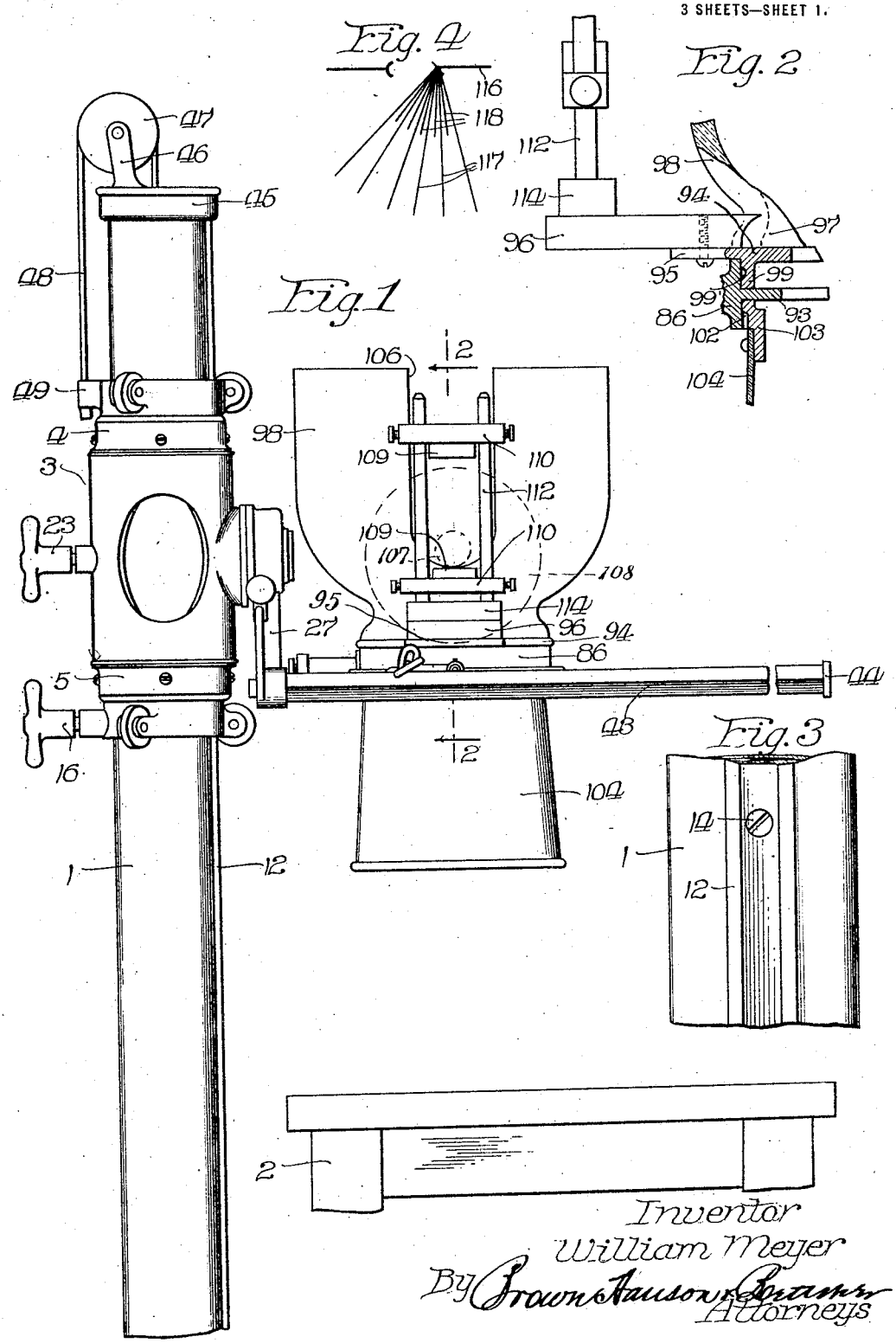

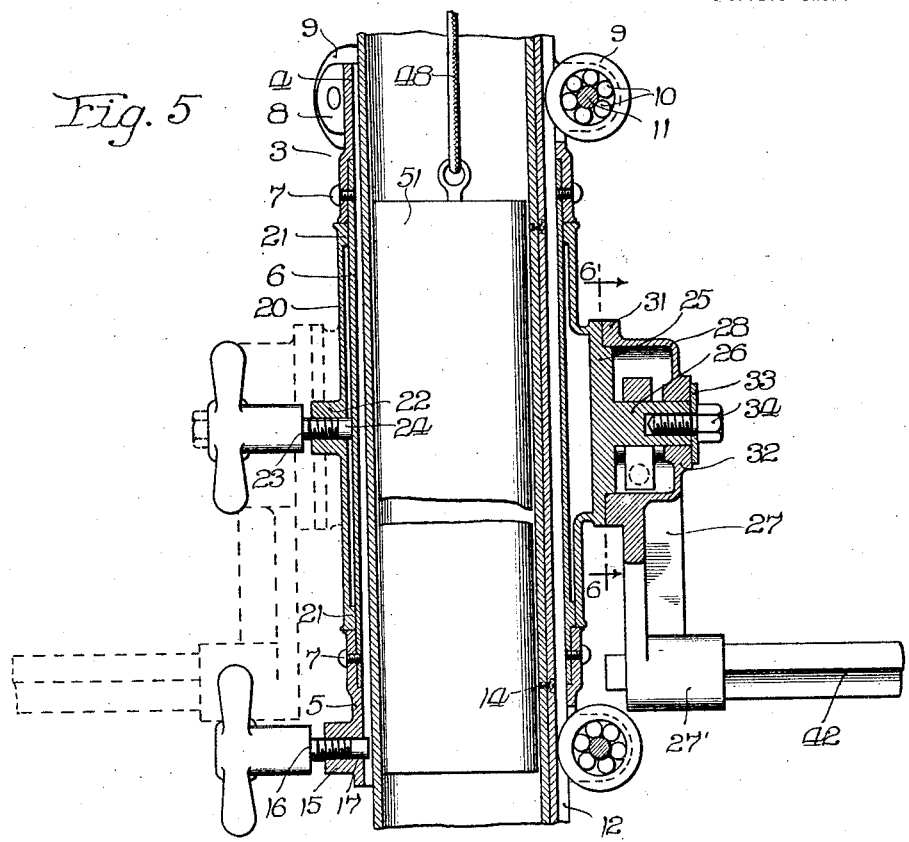
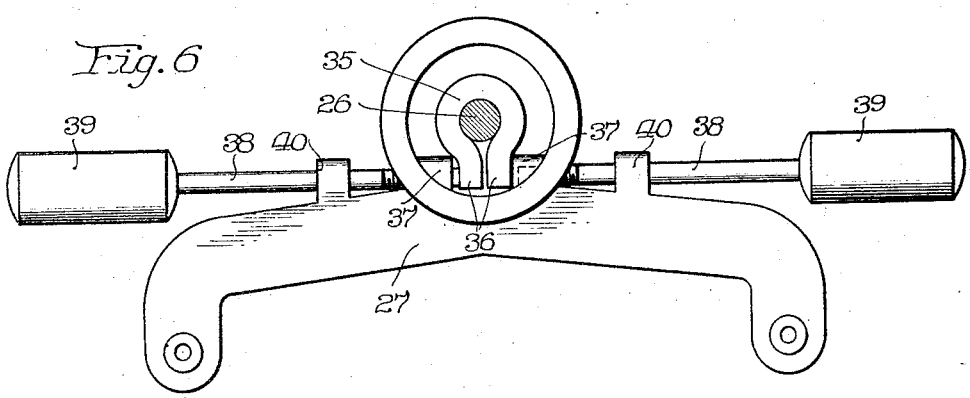

UNITED STATES PATENT OFFICE.

WILLIAM MEYER, OF CHICAGO, ILLINOIS.

X-RAY STAND.

1,414,658. Specification of Letters Patent. Patented May 2, 1922.

Application filed February 18, 1918. Serial No. 217,738.

*To all whom it may concern:*

Be it known that I, WILLIAM MEYER, a citizen of the United States, residing at Chicago, in the county of Cook and State of Illinois, have invented a certain new and useful Improvement in X-Ray Stands, of which the following is a full, clear, concise, and exact description, reference being had to the accompanying drawings, forming a part of this specification.

My invention relates to an X-ray stand. The primary object of my invention is to provide an improved supporting stand for X-ray tubes. This supporting stand is designed to have universal adjustability so that it can be adjusted to any desired point, or angle of use, with ease and facility. The flexibility of adjustment enables the tube to be brought into proximity to the desired object in substantially any position and to properly direct the rays thereupon. Where shadowgraphs are to be made of an object such for instance as a part of the body, and where the relation of the parts or members would be changed by changing the position of the body it is desirable to keep the body stationary and to move the source of rays. It is the object of my invention to provide a supporting stand for X-ray tubes and the like which will permit of great freedom in adjustment of the position of the tube.

Another object of my invention is to provide means for quickly and accurately shifting the X-ray tube relative to the patient and the sensitized plate, for the taking of stereoscopic shadowgraphs.

In order to provide a stereoscopic view of the object under examination, it is now common practice to take two separate shadowgraphs from different foci and then combine these two views into one stereoscopic view by suitable mirror devices. For accurate results the two shadowgraphs should be taken in relatively quick succession, so that there will be small probability of the patient moving between exposures. The means I employ for shifting the X-ray tube will make this transposition quickly, accurately and with minimum effort on the part of the operator.

The present invention is designed to provide a single stand or mounting to permit of the use of the same for either radiography or X-ray treatment.

The requirements for radiography and for X-ray treatment are different. In X-ray treatment the skin and tissues of the patient are the sensitive register for the X-ray. Inasmuch as the sensitiveness of the patient to X-rays varies and cannot be foretold in any particular case, it is imperative that strict adherence to known rules be observed by the operator. The sensitiveness of photographic plates for making shadowgraphs is a known fixed quantity and can be depended upon. Consequently, greater freedom is permitted in radiography. As the standard X-ray treatment for erythema comprises a dose consisting of 1200 milliampere seconds of exposure of the patient to X-rays from a bulb placed at a distance of 6 to 7 inches from the center of the bulb to the surface to be treated, it is essential that the mounting be such that the bulb can be so placed as to give the proper distance for giving standard treatment. Where greater distance is necessitated by the form of the mounting, the operator must guess at results, and inasmuch as a mistake may seriously hurt the patient, it is highly desirable that the rules of treatment be very strictly observed.

Heretofore the stereoscopic apparatus has been so constructed and placed in such position that it has taken up a distance greatly in excess of the standard distance, and as a consequence the operator has had to provide a mounting for the bulb for X-ray treatment different from the mounting for radiography. This has involved not only additional expense, but also great inconvenience. According to my invention the mounting is provided with stereoscopic apparatus so constructed and positioned as to permit of using the mounting, not only for radiography and stereoscopic radiography, but also for X-ray treatment without any change.

The above objects and numerous additional objects entering particularly into the mechanical construction of my invention will be more apparent from the following detail description taken in connection with the accompanying drawings in which I have illustrated one particular embodiment of my invention.

Figure 1 is a side elevational view of my improved X-ray tube stand;

Figure 2 is a sectional view taken approximately on the line 2—2 of Figure 1;

Figure 3 is a fragmentary front elevational view of the tubular standard;

Figure 4 is a diagram illustrating the discharge of X-rays from the cathode of an exhausted tube;

Figure 5 is an enlarged sectional view taken longitudinally through the tubular standard and the adjustable sleeve members thereon;

Figure 6 is a sectional view taken approximately on the line 6—6 of Figure 5;

Figure 7 is a fragmentary plan view of the adjustable frame and the carriage mounted therein;

Figure 8 is an enlarged detail section;

Figure 9 is an isolated side view of part of the carriage;

Figure 10 is a fragmentary bottom plan view of the carriage and frame;

Figure 11 is a sectional view taken on the line 11—11 of Figure 10; and

Figure 12 is a fragmentary front elevational view of the upper portion of the compression tube, showing the grooves in the ring carried thereby.

The hollow tubular standard 1 is supported at its lower end by any suitable supporting means. In my Patent No. 1,384,144, granted July 12, 1921, I have shown the standard 1 as being mounted on members adapted for sliding movement along horizontal rails attached to the side of the table 2. Where it is desired to have the X-ray tube portable, the standard 1 may be equipped with an ordinary tripod base provided with castor wheels.

Referring to Figures 1 and 5, a sleeve member 3 is arranged for vertical movement along the standard 1. This sleeve member comprises an upper shell 4 and a lower shell 5, connected by a sleeve 6. The ends of the sleeve seat in annular recesses in the shells 4 and 5 and are secured therein by screws 7. Each of the shells 5 and 6 is formed with pairs of projecting ears 8—8 between which are pivoted the rollers 9. Ball-bearings 10 are interposed between each roller 9 and its pivot 11, as clearly shown in Figure 5. There are preferably three of these rollers provided for each shell, two of which bear on the periphery of the tubular standard 1 and the third of which engages in a vertical track 12 secured as by screws 14 to the standard 1. This track consists of a flat bar having a substantially square groove cut or rolled in the outer flat side to provide a guide for the roller. This flat bar is fastened to the column 1 by screws having countersunk heads. This groove in connection with the rollers which run in it forms a longitudinal spline or keyway that prevents turning of the carriage or sleeve 3 on the column 1. The sleeve member 3 has a slightly larger internal diameter than the outside diameter of the standard 1 and is spaced away from the standard to avoid friction, by the inwardly projecting rollers 9. This sleeve 3 and connected rollers form a carriage for the X-ray tube and its adjustments.

A boss 15 is formed on the lower shell 5 and has a threaded hole therethrough for the reception of the clamping screw 16. A separate plug 17 is disposed in the threaded hole between the screw 16 and the standard 1. This plug 17 can have clamping engagement with the surface of the standard 1 without danger of marring the same.

An outer sleeve 20 rotatable about the inner sleeve 6 is confined between the shells 4 and 5 and encircling the sleeve 6. Small internal flanges 21—21 at the ends of the sleeve 20 bear on the surface of the inner sleeve 6 and space the outer sleeve therefrom. The sleeve 20 is provided with a boss 22 for receiving the clamping screw 23 and plug 24. The plug 24 is adapted to have clamping engagement with the surface of the inner sleeve 6.

A hub portion 25 is formed integral with the outer sleeve 20 and a stud 26 projects from this hub portion. A yoke-shaped member 27, provided with a central cap portion 28 is mounted for pivotal movement on the hub 25 and stud 26. The cap 28 has an annular flange 31 which seats in an annular recess in the face of the hub 25. A boss 32, in the top of the cap 28, is journaled on the stud 26. The yoke is retained in place on the hub 25 by a washer 33 and capscrew 34, which threads into the stud 26.

Referring to Figure 6, a resilient clamping member 35 of wrought iron or the like, encircles the stud 26 within the cap 28. Extending ears 36 on the ends of the clamp 35 lie between bosses 37 in the cap 28 through which thread hand screws 38. These hand screws 38 are provided with insulating handles 39. The hand screws 38 are guided by small guide members 40 extending from the yoke member 27.

When pressure on the ends of the clamp 35 is released it springs open so that the frictional engagement between the clamp 35 and stud 26 is small. When the yoke 27 has been tilted to a desired angle, it can be held there by tightening up one or both hand screws 38.

Bosses 27' on the ends of the arms of the yoke 27 support square bars 42 which are rigidly set therein with the edges of the bars upward. These bars comprise the side members of a frame 43, which I shall hereinafter describe.

Mounted on top of the standard 1 is a cap 45 having bracket arms 46 between which is pivoted a pulley 47. A cable 48 runs over this pulley and has one end thereof attached to a lug 49 on the upper shell 4. The other end of the cable extends down through a central aperture in the cap 45 into the tubular support 1 where it is attached to a counterweight 51.

The frame 43 supports the X-ray tube and from the foregoing description it will be apparent that this frame can be adjusted to practically any position. Vertical adjustment is easily obtained by releasing the clamping screw 16 and rolling the entire unit up or down the standard 1. The weight of the sleeves, the frame, and the X-ray tube is nicely counterbalanced by the weight 51, and this vertical adjustment requires very little effort.

By releasing the clamping screw 23, the frame 43 may be revolved to any angular position about the standard 1 throughout the full 360°, something not possible with any of the devices of the prior art.

When it is desired to direct the X-rays diagonally down upon the table 2, the frame 43 is tilted with respect to the standard 1. The frame may be clamped in a vertical plane with the rays projected horizontally for fluoroscopic screen exposures. Any angular position about the pivot 26 is possible.

The square bars 42 of the frame 43 extend out from the yoke 27 a suitable distance which is generally determined by the width of the table 2. A crossbar 44 joins the ends of these bars and completes the frame 43.

Referring to Figures 7 and 9, a carriage designated 53 in its entirety, is mounted for rolling motion between the frame bars 42. The carriage 53 is composed of side members 55—55' connected together by bolts 56 and nuts 57 threading thereon. Small grooved rollers 54 are pivoted in openings in the side members 55—55'. These rollers bear on the inner oblique faces of the square bars 42.

A lug 58 projects laterally from the side member 55' and has a hole therethrough receiving one end of the rod 59. A set screw 61 threads through the lug 58 and rigidly holds the end of the rod 59.

The rod 59 extends into a dashpot cylinder 62 which is supported parallel to the frame bar 42 by giudes 63—64, movable along the bar 42. The cylinder 62 and its two guides 63—64 comprise a unit which is shiftable along the bar 42 and is adapted to be clamped in any adjusted position by a thumb screw threading through the guide 64 and engaging the bar 42.

A piston 66 is secured to the end of the rod 59 within the cylinder 62. The carriage 53 and rod 59 are normally retained in the position illustrated in Figure 7 by the spring 67 which is disposed about the rod 59 between the pin 68 and the collar 69. A set screw 71 threading through the cylinder 62 holds the collar 69 in place.

Attention is now directed to the bottom plan view in Figure 10 and the sectional view in Figure 11. It will be understood that the view of Figure 11, being sectional of that of Figure 10 is inverted with respect to Figure 7. The guide 64 has a lug 73 projecting into a long depression 74 formed in the bottom of the side member 55'. A trigger lever 75 is pivoted on this guide by a screw 76 threading into the lug 73. A spring 77 having its ends secured to the trigger 75 and to a stud 78 on the guide 64 normally holds the trigger in the position illustrated. The stud 78 and a stop 79 integral with the guide 64 limits the movement of the trigger 75. The hook portion 75' of the trigger engages with a stud 81 depending from the side member 55', when the carriage 53 is pulled to the left (Figure 7) against the tension of the spring 67. Motion in this direction is arrested by engagement of the lug 73 with the shoulder at the right hand end of the depression 74.

The carriage is now in position for taking the first stereoscopic radiograph. After energizing the X-ray tube to make the first radiograph a new plate is substituted in the plate holder, the carriage is released and the second radiograph is taken.

The releasing of the carriage 53 is effected by pressing the trigger lever 75 with the finger or by pulling on the cord 82 attached to the end. The carriage is shifted a predetermined distance, until the lug 73 engages with the shoulder 74' at the lefthand end of the depression 74.

The dashpot 62 prevents too rapid a movement of the carriage 53 which might jar and damage the X-ray tube or protecting shield. The speed of the carriage is regulable by the screw 83 which threads into the guide 63 and controls the vent 84 leading into the dashpot cylinder 62, as shown in Figure 8. One side of this screw is milled off and it will be apparent that the effective opening into the cylinder 62 and the rate of the entering air can be accurately varied by manipulation of this screw to secure different speeds of the carriage.

A ring 86 is pivotally mounted in the side members 55—55' by trunnions 87 having reduced ends which engage in suitable openings in the side members. The hub 88 of a slotted sector arm 89 is pinned to the reduced end of one of the trunnions 87. A thumb screw 91 threads into the side member 55 through the arcuate slot in the sector arm 89. A hexagonal enlargement 92, on the shank of the screw 91, is adapted to bear against the sector arm 89 and clamp the same to the side member 55 with the ring 86 in any angular position.

The ring 86 has a radial flange 93, (see Figure 2) upon which rests the ring 94. This latter ring has diametrically opposite ledges 95 to which are screwed the wood strips 96. These strips have their inner ends cut on a curve and are conformed to overlap and clamp the flared base 97 of the lead glass shield 98 to the ring 94. The curved ends of the strips 96 conform to the curved periphery of the shield and prevent lateral movement thereof.

The depending flange 99 of the ring 94 has an annular groove 99' therein and engaging in this groove are the screws 100—100' in the ring 86 (see Figure 7). The two screws 100 permit rotative movement of the shield 98 and ring 94 but prevent vertical withdrawal thereof, while the third screw 100' is adapted to be manipulated to clamp the ring and shield in any angular position.

Directly beneath the screws 100—100' and therefore not showing in Figure 7 are similar screws which engage in the annular groove 102 of the compression tube flange 103. This groove is provided with vertical grooves 102' forming a bayonet joint to facilitate insertion and removal of the compression tube 104.

The shield 98 has the usual openings 106 to receive the limbs 107 of the X-ray tube 108. The limbs 107 are supported between rubber cushions 109—109 which are glued to the crossbars 110—110, adjustably mounted on the uprights 112—112. The crossbars 110 and uprights 112 are preferably of wood or other insulation. These uprights are mounted in a wood block 114 which is attached to the outer end of the strip 96.

In the diagram of Figure 4 I have roughly illustrated the different rays emanating from the electrode 116 of the tube 108. The long rays 117 are the hard penetrative rays, and the shorter rays 118 are the softer and less penetrative rays. It will be seen that the short rays 118 have a limited radius of action.

It will be noted from Figure 1 that the shield openings 106 extend down quite close to the base of the shield. For X-ray treatment the tube is preferably lowered in the shield 98 by adjustment of the crossbars 110, until its lower periphery approaches the base line of the shield or even extends down into the center of the ring, as shown in dotted lines.

The rays radiating from the tube are confined against lateral propagation by the shield and ring 86.

To submit a patient to X-ray treatment, the compression tube 104 is removed. A tube of proper resistance is provided and the current strength through the tube is regulated to a proper value to give out the desired rays.

It is possible to proportion the relative densities of the rays by controlling the current flow through the X-ray tubes, the penetration of the rays being a direct ratio to the resistance of the X-ray tube.

Therefore by controlling or regulating the resistance of the X-ray tube the requirements for fluoroscopy or radiography or X-ray treatment can be obtained.

For fluoroscopy the rays required are sparse but of great penetrating power, obtained from a tube of high electrical resistance excited by a current of small milliamperage and high voltage.

For radiography the rays required are dense and relatively short. It is therefore important to arrange the X-ray tube in such a position that the penetrating power shall be just sufficient to show the relative density of the various parts radiographed. Obtained from an X-ray tube having its resistance proportioned to the density of the object and excited by a current of sufficient voltage to overcome this resistance the intensity in milliamperes multiplied by the time constitute the factors to make the proper chemical change in the photographic emulsion, and as a long exposure might injure the patient it is desirable to be able to shorten the distance from the X-ray tube to the patient and thus increase the intensity and shorten the time of exposure.

The frame 43 can be lowered to a certain distance from the body of the patient, prescribed by the nature of the treatment and the strength of the rays, and treatment proceeds, and the X-ray tube 108 can be lowered in the shield until its periphery is in the plane of or beyond the plane of the opening in the bottom of the shield.

The adjustments of the tube 108 relative to the frame 43, need no further description. By releasing the clamping screw 65 and moving the guides 63—64 the carriage 53 can be brought to any desired location along the frame 43. The ring 86 and shield 98 can be adjustably inclined to diagonally direct the rays down toward the table 2.

The compression tube 104 is only employed in the taking of shadowgraphs, its function being to direct the penetrating rays to the desired spot and to prevent oblique rays from passing out beyond the scope of the intended exposure to other parts of the patient's body.

I believe I am the first to provide a stand of this character in which the X-ray tube can be swung completely about the support or column and still be guided for vertical adjustment only.

I do not intend to be limited to the particular details described, as it will be apparent that my invention is susceptible of extensive modification to meet particular requirements.

I claim:

1. In an X-ray tube stand, a frame, a carriage movable along said frame, said carriage adapted to support an X-ray tube, spring means for shifting said carriage along said frame, manually operated trigger means adapted to release said spring means, and adjustable means for governing the rapidity of said shifting movement.

2. In combination, a supporting standard, a member movable along said standard, a stud projecting from said member, a frame member pivoted on said stud, a split clamping member encircling said stud, and a screw carried by said frame member adapted to engage said clamping member to clamp the same about said stud.

3. In an X-ray tube stand, a supporting standard, a sleeve member movable longitudinally on the standard, a stud projecting from said member, a frame member pivoted on said stud, a split clamping member encircling said stud, a screw carried by the frame member to engage said clamping member to clamp the same upon the stud, said screw being elongated and provided with an insulated handle for use in rotating said frame member on said stud.

4. In an X-ray tube stand, a supporting standard, a member movable along the standard, a stud projecting from said member, a frame member pivoted on said stud, a loose split clamping member encircling said stud, opposed clamping screws carried by the frame member engaging said clamping member to clamp same upon the stud, such screws extending laterally from said frame member and provided on their free ends with insulated handles for use in placing said frame member circumferentially on said stud.

5. In an X-ray tube stand, a supporting standard, a frame supporting member movable on said standard, a stud projecting from said member, a circular base surrounding the stud, a housing mounted on the stud and base and rotatable thereon, a clamping ring loosely mounted on the stud within the housing, a frame yoke carried by the housing, screws guided on the yoke entering said housing and engaging said ring to clamp same on the stud to hold the housing against rotation thereon, said screws having insulated handles extending beyond said yoke for manipulating said housing and its carried parts.

6. In an X-ray tube stand, a frame, a carriage movable along the frame and adapted to support an X-ray tube or the like, anti-friction devices interposed between the carriage and frame, means carried by the carriage and adapted to be clamped at various places to the frame, a spring interposed between the carriage and the clamps adapted to be compressed to set the carriage in a predetermined position, latch means for holding the carriage in such position, means for releasing said latch to permit said spring to move the carriage, and a stop on the carriage adapted to engage said latch for determining the second position of the carriage.

7. In a device of the kind described, a frame, a carriage movable along the frame and adapted to support an X-ray tube, means for clamping the carriage in adjusted positions, spring means for automatically shifting the carriage a predetermined distance along said frame, a dash pot for retarding said shifting, and a screw cut away at its point on one side at an incline and entering a threaded hole in the wall of said dash pot for regulating the speed of the shifting of said carriage.

8. In an X-ray tube stand, a shield, a pivotally mounted ring for carrying said shield, a circumferential flange on one side of the ring for centering the shield thereon, a compression tube, a similar flange on the opposite side of the ring for centering said compression tube thereon in axial alignment with the shield and means carried by the ring for securing the shield and compression tube thereon.

9. In an X-ray tube stand, a frame, a ring carried by the frame adapted to support an X-ray tube, trunnions on the ring, bearings on the frame for mounting the ring so that it can be tilted, an arm secured to one of the trunnions, an arcuate slot in said arm, and a clamping screw carried by the frame and projecting through said slot to hold said ring and the parts carried thereby in an adjusted tilted position.

10. In combination, a frame, a carriage movable on the frame, a ring carried by the carriage, a depending circumferential flange on said ring, a ray confining tube having a base adapted to be received within said flange, pins projecting through said flange and bayonet grooves in the periphery of said base for receiving said pins and locking said tube to said ring.

11. In combination, a supporting standard, a frame vertically and angularly adjustable upon said standard, X-ray tube supporting means carried by said frame, said supporting means being movable along said frame, spring means compressed upon movement of said supporting means in one direction, means for restraining said spring means upon attaining the desired movement of said supporting means, and means for releasing said restraining means whereupon said supporting means is automatically shifted in the opposite direction by the expansive stress of said spring means.

In witness whereof I hereunto subscribe my name this 13th day of February, A. D. 1918.

WILLIAM MEYER.